United States Patent [19]
Hou et al.

[11] 3,846,356
[45] Nov. 5, 1974

[54] TRIALKYLSILYL-TREATED FUMED SILICON DIOXIDE PIGMENTS FOR ELECTRO-DEPOSITION

[75] Inventors: Kenneth C. Hou, Somerset; Norman W. Thomas, Warren, both of N.J.

[73] Assignee: Celanese Corporation, New York, N.Y.

[22] Filed: June 8, 1973

[21] Appl. No.: 368,153

[52] U.S. Cl............ 260/18 EP, 204/181, 260/18 R, 260/22 CB, 260/23 AR, 260/29.2 EP, 260/29.2 UA, 260/37 EP, 260/37 R, 260/41 A
[51] Int. Cl............................................ C08g 51/04
[58] Field of Search.......... 260/18 EP, 18 R, 37 EP, 260/37 R, 41 A, 29.2 EP; 204/181

[56] References Cited
UNITED STATES PATENTS
2,751,369   6/1956   Te Grotenhuis...................... 260/41
3,697,467   10/1972   Haughney........................... 204/181

*Primary Examiner*—Donald E. Czaja
*Assistant Examiner*—Eugene C. Rzucidlo

[57] ABSTRACT

This invention relates to novel pigments for electro-depositable compositions and in particular to the use of fumed silicon dioxides which have been surface-treated with polyalkylsilyl groups in their pigmentary form to produce electro-depositable coatings in conjunction with various electro-deposition binders, pigments, fillers, etc.

6 Claims, No Drawings

TRIALKYLSILYL-TREATED FUMED SILICON DIOXIDE PIGMENTS FOR ELECTRO-DEPOSITION

BACKGROUND OF INVENTION

Recently electro-deposition has been achieving wide industrial acceptance as a method for applying protective coatings. The coatings achieved have excellent properties for many applications. Virtually any conductive substrate may be coated by electro-deposition, the most common being iron, steel, aluminum, copper, zinc, brass, tin, nickel and chromium, as well as other metals and pre-treated metals.

Particular wide use of electro-deposition has been found in the automotive and industrial finishing area.

One of the main problems exhibited by electro-deposition resins has been their lack of complete throwing power. Throwing power is generally defined as the ability of an electro-deposition resin upon application to reach small interior surfaces of a body being coated.

A typical throwing power test involves the immersion in an appropriately-sized pipe which has been placed in an electro-deposition bath of a metallic strip. The metallic pipe and strip are used as one electrode and the bath wall as the other electrode. The electro-deposition process is carried out and the height of coating on the strip immersed within the metal pipe is measured. The difference between the height coating is obtained on the strip and the height coating is obtained on the outside of the pipe is measured and represents a percentage of theoretically complete throwing power.

Ancillary to incomplete throwing power is a reduced "rupture voltage." "Rupture voltage" is the voltage at which the coating ceases to act as a metal insulator on the metallic article being coated and at which the bath becomes conductive. In other words, an extreme current flow is noted at this particular voltage.

SUMMARY OF INVENTION

It has now been discovered that by incorporating up to about 15 percent, preferably about 2 to 10 percent, of a surface-modified trialkylsilyl fumed silicon dioxide pigment it is possible to increase the throwing power of ionically-solubilized electro-deposition resins and at the same time increase their rupture voltage without a corresponding decrease in other important properties. This system is particularly applicable to epoxy ester-based electro deposition resins which have been reacted with polybasic acids, such as maleic anhydride, and solubilized by the use of the various amines.

A number of electrodepositable resins are known and can be employed to provide the electrodepositable compositions which may be treated by the process of this invention. Virtually any water-soluble, water-dispersible or water-emulsifiable polyacid or polybasic resinous material can be electrodeposited and, if film-forming, provide coatings which may be suitable for certain purposes. Any such electrodepositable composition is included among those which can be employed in the present invention, even though the coating obtained might not be entirely satisfactory for certain specialized uses.

Presently the most widely used electrodeposition vehicle resins are synthetic polycarboxylic acid resinous materials which include a reaction product or adduct of the drying oil or semi-drying oil fatty acid ester with a dicarboxylic acid or anhydride. By drying oil or semi-drying oils fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTMD1467–57T. Examples of such esters include linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil, and the like.

Also included among such esters are those in which the esters themselves are modified with other acids, including saturated, unsaturated or aromatic acids, such as butyric acid, stearic acid, linoleic acid, phthalic acid, isophthalic acid, terephthalic acid or benzoic acid, or the anhydride of such an acid. One inexpensive acid material which has been found to produce good results in many instances is rosin, which is composed of chiefly abietic acid and other resin acids. The acid-modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols, such as trimethylolpropane, pentaerythritol, sorbitol, and the like. If desired, the esters can also be modified with monomers such as cyclopentadiene or styrene, and the modified esters produced thereby can be utilized herein. Similarly, other esters of unsaturated fatty acids, for example, those prepared by the esterification of tall oil fatty acids with polyols, are also useful.

Also included within the term "drying oil fatty acid esters" as set forth herein are alkyd resins prepared utilizing semi-drying or drying oils; esters of epoxides with such fatty acids, including esters of diglycidyl ethers of polyhydric compounds, as well as other mono-, di- and polyepoxides, semi-drying or drying oil fatty acid esters of polyols, such as butanediol, trimethylolethane, trimethylolpropane, trimethylolhexane, pentaerythritol, and the like; and semi-drying, or drying fatty acid esters of resinous polyols, such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic, anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and 250° C.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpha-methyl styrene, alphabutyl styrene, vinyl toluene, butadiene-1,3, isoprene, and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl methacrylate, butyl methacrylate, heptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alphachloroacrylate, dimethyl maleate, diethyl maleate, dimethyl fumarate, diethyl fumarate, and diethyl glutaconate; organic nitriles, such as acrylonitrile, methacrylonitrile, ethacrylonitrile, and the like.

As is apparent from the above discussion and the examples set forth, which, of course, do not include all of the ethylenically unsaturated monomers which may be employed, any such monomer can be utilized. The preferred class of monomers can be described by the formula

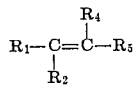

where $R_1$ and $R_2$ is hydrogen, alkyl or carboxyalkyl and $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene, substituted styrene, alkyl acrylates, alkyl methacrylates, diolefins and acrylonitrile.

The reaction of the fatty acid ester, the acid or anhydride and any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. For example, a reaction product of linseed oil, maleic anhydride and styrene is made by first reacting maleic anhydride with linseed oil and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 5 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reaction product, it is typically used in amounts between about 5 percent and about 35 percent by weight, based upon the total weight of acid of anhydride and ester, with between 10 percent and 25 percent being used in those products preferred at present. Thus, in most instances, the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

Neutralization of these products is accomplished by reaction of all or part of the dicarboxylic anhydride groups with a base, usually an amine. Generally up to about 90 percent of such groups can be neutralized in unesterified adducts; the partially-esterified porducts are often neutralized to a greater extent, based on unesterified acid groups remaining.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethylolpropane, glycerol, pentaerythritol and the like are utilized, they are employed in small amounts, or in conjunction with the diol, or in the presence of a monohydric alcohol, and are used with adducts having a relatively low proportion of acidic component. The various diols that can be employed include, for example, ethylene glycol, 1,2- propylene glycol, 1,4-butanediol, 1,5-pentanediol, 2-methyl-2-n-propyl-1, 3-propanediol, and similar higher or sub stituted alkylene glycols, containing up to about 20 carbon atoms or more. Glycol ethers may also be employed, such a diethylene glycol, triethylene glycol, poly (oxytetramethylene) glycols and the like, those having molecular weights of up to about 400 being most useful. Water-insoluble diols are often preferable, and especially desirable water-dispersed compositions for electrodeposition are obtained using 2,2-bis(4-hydroxycyclohexyl) propane (which has given the best results), neopentyl glycol, 1,-1'-isopropylidene-bis(p-phenyleneoxy)di-2-propanol, and similar diols.

The proportions of polyol and ester-anhydride adduct that are employed depend upon various factors, but are in general limited only by the need to avoid gelation of the product.

In most instances, the reaction products herein are made from about 65 percent to about 98 percent of esteranhydride adduct and about 2 percent to about 35 percent of a diol, these percentages being by weight. However, it will be understood that depending upon the molecular weights of the reactants, varying amounts within these ranges or outside these ranges are employed with particular reaction systems.

In many instances, only part of the anhydride groups of the adduct, e.g., about 10 percent, are reacted with the polyol. Of those anhydride groups reacted, it is preferred that only one of the carboxyl groups is esterified in each instance. This is relatively easily accomplished because the half-ester of the dicarboxylic acid anhydride moieties present is preferentially obtained before the full ester begins to be formed. In addition, production of the full ester generally requires more stringent conditions, such as higher temperatures, even when an excess of hydroxyl groups are present. Thus, while it is not necessary that each anhydride form the half-ester and some of the dicarboxylic groups may be fully esterified, in actual practice the half-esters of the dicarboxylic acid moieties are usually obtained.

The reaction with the polyol is ordinarily carried out by admixing the initial reaction product of the fatty ester, the acid or anhydride, and any additional monomer with the polyol. The reaction at room temperature is quite slow, and thus, it is preferred to heat the reaction mixture moderately, i.e., to about 80° C. or higher. The preferred maximum temperature is that at which the full ester begins to be formed, which varies with the particular polyol and which is in most cases about 180° C., but higher temperatures up to about 300° C., can be used if desired, for example, when the number of hydroxyl groups present does not exceed the number of anhydride groups present.

When the reaction is carried out as described, the product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially-esterified product with a base.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are usually employed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about 1 percent and about 20 percent by weight of the interpolymer, with the remainder being made up of one or more other copolymerizable ethylenically unsaturated monomers. The most often used are the alkyl acrylates, such as ethyl acrylate; the alky methacrylates, such as methyl methacrylate; and the vinyl aromatic hydrocarbons, such as styrene, but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanidines, guanamines, and alkyl and arylsubstituted derivatives of such compounds can be employed, as can other aldehydes, such as acetaldehyde. The alkylol groups of the products can be etherified by reaction with an alcohol, and the products utilized can be water-soluble or organic solvent-soluble.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds, such as those in which a conventional alkyd (such as a glyceryl phthalate resin), which may be modified with drying oil fatty acids, is made with a high acid number (e.g., 50 to 70) and solubilized with ammonia or an amine, or those in which a surface active agent, such as a polyalkylene glycol (e.g., "Carbowax."), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and 5000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule.

In order to produce an electrodepositable composition, it is necessary to at least partially neutralize the acid groups present with a base in order to disperse the resin in the electrodeposition bath. Inorganic bases such as metal hydroxides, especially potassium hydroxide, can be used. There may likewise be used ammonia or organic bases, especially water-soluble amines, such as, for example, the mono-, di-, and tri-lower alkyl amines such as methylamine, ethylamine, propylamine, butylamine, dimethylamine, diethylamine, dipropylamine, dibutylamine, and n-methyl-butylamine, triethylamine, tributylamine, methyldiethylamine, dimethylbutylamine, and the like; cyclic amines, such as morpholine, pyrrolidine, piperidine, diamines such as hydrazine, methylhydrazine, 2,3-toluene diamine, ethyl diamine and piperazine, and substituted amines such as hydroxylamine, ethanolamine, diethanolamine, butanolamine, hexanolamine and methyldiethanolamine, octanolamine, diglycolamine and other polyglycol amines, triethanolamine, and methylethanolamine, n-amino-ethanolamine and methyldiethanolamine, and polyamines such as diethylene triamine, triethylene tetramine, hexamethylene tetramine.

There may be present in the electrodepositable composition in addition to the trialkylsilyl modified fumed silicon dioxide pigments of the invention, any of the conventional type of pigments employed in the art, for example, iron oxide, lead silico chromate, strontuim chromate, carbon black, titanium dioxide, talc, barium sulfate and the like, as well as combinations of these and similar pigments. Color pigments such as cadmium yellow, cadmium red, phthalocyananine blue, chrome yellow, toluidine red, hydrated iron oxide, and the like, may be included if desired.

The total pigment to binder ratio should not exceed about 3/1. The trialkylsilyl modified fumed silicon dioxide pigment may comprise the total pigment content. However, levels as low as 10 percent of the total pigment are feasable.

There is often incorporated into the pigment composition a dispersing or surface active agent. If such a surface agent is used, it should be the non-ionic or anionic type in the case of polyacid vehicles, or a combination of these types. In the case of polybasic resin, non-ionic or cationic agents are preferred. Usually the pigment and surface active agent, if any, are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methylpentanone-2 (Pent-Oxone).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypolyethylene alkanols, or phosphate esters including ethoxylated alkylphenol phosphates. Other additives which may be employed include anti-foaming agents, suspending agents, bactericides, and the like.

In addition to the electrodeposition vehicle resins described above, there may be present in the electrodepositable compositions other resinous materials which are non-carboxylic acid materials. For example, there may be added up to about 50 percent by weight of an aminealdehyde condensation product. Examples of such aminealdehyde condensation products employed are aldehyde condensation products of melamine, urea, acetoguanamine or a similar compound, and may be water-soluble or organic solvent-soluble. Generally, the aldehyde employed is formaldehyde, although useful products can be made from other aldehydes such as acetaldehyde, crotonaldehyde, acrolein, benzaldehyde, furfural and others. Condensation products of melamine or urea are the most common and are preferred, but products of other amines and amides in which at least one amido group is present can be employed.

For example, such condensation products can be produced with triazines, diazines, triazoles, guanidines, guanamines, and alkyl and aryl-substituted derivatives of such compounds, including alkyl-substituted and aryl-substituted cyclic ureas, and alkyl and aryl-substituted melamines. Examples of such compounds are: N,N'-dimethyl urea, benzyl urea, N,N'-ethylene urea, diazine diamide, formaguanamine, benzoguanamine, ammeline, 2-chloro4,6-diamino-1,3,5-triazine. 3,5-diaminotriazole, 4,6-diaminopyrimidine, 2,4,6-triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a menner well known in the art, using acidic or basic catalysts and varying conditions of time and temperature. The aldehyde is often employed as a solution in water or alcohol, and the condensation, polymerization and etherification reactions may be carried out either sequentially or simultaneously.

In a manner similar to the anionic resins described above, the cationic resins may be formulated with adjuvants, such as pigments, solvents, surfactants, crosslinking resins, and the like.

The polyacids are anionic in nature and are dispersed or dissolved in water with alkaline materials such as amines or alkaline metal hydroxides and, when subjected to an electric current, they migrate to the anode. The polybasic resins, solubilized by acids, are cationic in character and when these resins are water-dispersed or solubilized with an acid such as acetic acid, the material deposits on the cathode under an electric current.

The trialkylsilyl fumed silicon dioxide particles of the instant invention are prepared by well-known methods, and such materials may be purchased from commercial sources including Cabot Corporation, under the trademark "Silanox 101." Basically, the fumed silicon materials are prepared by flame hydrolysis of silicon tetrachloride to fumed silicon dioxide particles. The resulting particles are non-porous amorphous chemicals of high surface area. These particles are then trialkylsilylated by reacting pendant hydroxyl groups present in the silicon dioxide particles with a trialkylsilyl chloride. The resulting product is quite hydrophobic in nature, and preferably has a surface area in the range of about 50 to 350 m$^2$/g.

The alkyl group present when trialkylsilyl modification is carried out can contain up to about 6 carbon atoms, and may be selected from, among others, methyl, ethyl, propyl, butyl groups and the like. The methyl group is preferred.

In the electrodeposition process, a process well-described in the art, the aqueous bath containing the composition is placed in contact with an electrically conductive anode, and an electrically conductive cathode. The coating is deposited upon the appropriate electrode so that the conductive substrate to be coated is used as that electrode. Upon passage of electric current (normally direct current) between the anode and the cathode, while in contact with the bath containing the coating composition, an adherent film of the coating composition is deposited on the appropriate electrode.

The conditions at which the electrodeposition process is carried out are those conventionally used in electrodeposition. The applied voltage may vary greatly and can be as low as, for example, 1 volt, or as high, for example, as 500 volts or higher. It is typically between 50 and 350 volts. The current tends to decrease during electrodeposition and the films become electrically insulative and cause the deposition of film to be self-terminating at any particular voltage.

The electrode coated is preferably any electrically conductive metal, such as iron, steel, aluminum, galvanized steel, phosphatized steel, zinc and the like.

The concentrations of the coating composition in the aqueous bath used electrodeposition is not critical and relatively high levels of coating composition can be used. However, it is ordinarily desirable to use a low concentration of coating composition since this is one of the benefits inherent in this system. Baths containing as little as one percent by weight of the coating composition in water can be employed. In general practice, the baths used usually contain 5 and about 15 percent by weight of paint solids. Generally it is preferred not to use more than 20 or 25 percent by weight of the coating composition in the bath, although there is no technical reason why films cannot be produced in even higher levels. Once the film is deposited upon the substrate and the substrate removed from the bath, the article is treated as one which has been coated in the conventional painting operation. The article may be air-dried or, usually, it is heated in an oven or by some other appropriate means to bake or dry the film. When this is done, the baking temperatures of about 200° F. to about 500° F. for 5 to 60 minutes are usually employed.

The pigmented coatings of the instant invention exhibit truly superior throwing power as defined above. When the pigments are utilized as described herein, increases in throwing power of 30 to 50 percent are not unusual.

The invention is further described in conjunction with the following examples, which are considered to be illustrative rather than limiting. All parts and percentages throughout this specification are by weight unless otherwise stated.

EXAMPLE A

A maleanized epoxy ester resin was prepared by reacting EpiRez$^{(R)}$510 (Celanese Coatings Company weight per epoxide 190) with approximately 2 equivalents per epoxide of linseed fatty acid. The resulting ester was then maleinized with 10 percent anhydride and solubilized using 0.8 equivalents triethanol amine.

EXAMPLE B

The resin of Example A was then compounded with a fumed silica having a particle size of about 7 millimicrons so that the silicon content was 5 percent by weight of the binder content. The resulting formulation was diluted to 8 percent solids and electro-deposited on a Bonderite 40 phosphate-coated cold roll steel panel. Throwing power was found to be 60 percent complete at 250 volts. The rupture voltage was 280 volts.

EXAMPLE C.

The procedure of Example B was repeated except that a 2 percent by weight of Silanox 101 was added in place of the fumed silica. Silanox 101 is a trimethylsilylated fumed silicon dioxide having a surface area of 225 m$^2$g, a bulk density of 3 lbs./ft.$^3$, and a specific gravity of 2.2. The rupture voltage was increased to 340 volts. Throwing power at 250 volts was 65 to 70 percent.

EXAMPLE D.

Example B was repeated utilizing a 5 percent level of Silanox 101. The throwing power was 70 to 75 percent at 250 volts, and increased to 80 percent at 300 volts. The rupture voltage increased to 370 volts.

EXAMPLE E.

A 10 percent Silanox modified version of Example D ruptured at 400 volts. Throwing power at 250 volts was approximately 80 percent, increased to 85 percent at 350 volts, and 90 percent at 390 volts.

As can be seen, the addition of a trialkylsilylated fumed silicon dioxide pigment to electro-deposition resins greatly and unexpectedly increases their throwing power and rupture voltage.

The previously described examples are merely illustrative and are not meant in any way to limit the scope of the instant invention.

What is claimed is:

1. An aqueous electro-depositable composition comprising an ionically solubilized synthetic organic resin vehicle having dispersed therein in pigmentary form up to about 15 percent by weight, based upon the vehicle, of a trialkylsilyl-treated fumed silicon dioxide pigment having a surface area in the range of 50 to 350 m$^2$/g wherein the total pigment to binder ratio is not higher than about 3 to 1.

2. The composition of claim 1 wherein the silicon pigment is present in the 2 to 10 percent range.

3. The composition of claim 1 wherein the vehicle comprises a base solubilized synthetic polycarboxylic acid vehicle resin.

4. The composition of claim 1 wherein the vehicle resin comprises a base solubilized epoxy ester-polycarboxylic acid-containing vehicle.

5. The composition of claim 1 wherein the alkyl group in the trialkylsilyl-treated fumed silicon dioxide pigments contain up to about six carbon atoms.

6. The composition of claim 5 wherein the alkyl group is methyl.

* * * * *